L. MORRISON & A. G. HARMS.

Saw-Hangings.

No. 5,646. Reissued Nov. 4, 1873.

WITNESSES:-
J. Homer Eldredge
John C. Harris

INVENTORS
Lawrence Morrison
Amos G. Harms
by Cochrane & Malcomson
their Attys

AM. PHOTO-LITHOGRAPHIC Co. N.Y. (OSBORNE'S PROCESS)

UNITED STATES PATENT OFFICE.

LAWRENCE MORRISON AND AMOS G. HARMS, OF ALLEGHENY CITY, PA.

IMPROVEMENT IN SAW-HANGINGS.

Specification forming part of Letters Patent No. 101,492, dated April 5, 1870; reissue No. 5,646, dated November 4, 1873; application filed July 24, 1873.

DIVISION A.

*To all whom it may concern:*

Be it known that we, LAWRENCE MORRISON and AMOS G. HARMS, of Allegheny City, in the county of Allegheny and State of Pennsylvania, have invented certain new and useful Improvements in Saw-Pitman Head; and we do hereby declare the following to be a full and clear description thereof, reference being had to the accompanying drawing forming part of this specification, in which—

Figure 1:
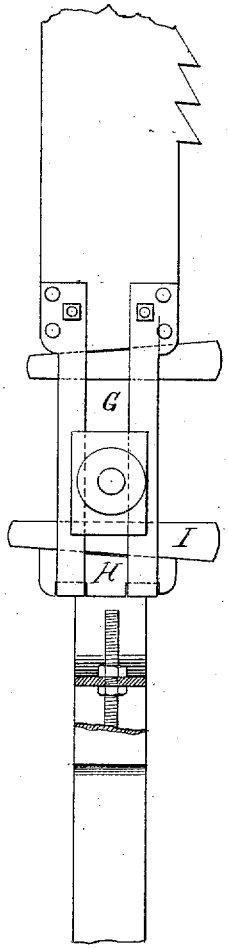
Figure 2:
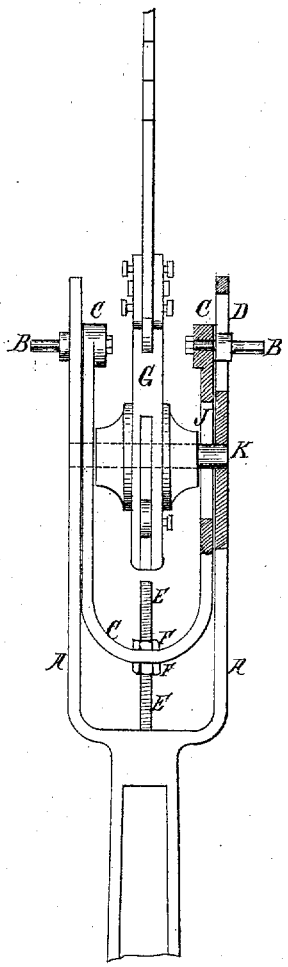

Figure 1 is a sectional side view of the pitman-head, showing, also, the saw-buckle and saw attached. Fig. 2 is a front view of the same, with one side in section.

This invention consists in constructing the saw-pitman head with inner adjustable jaws, to which the pitman-guide or catch-pins are attached, by means of which the oscillating motion of the saw may be easily governed and regulated with great accuracy.

In the drawing, A A represent the outer jaws of the pitman-head, which have vertical slots D near their upper ends. The wrist-pin K is attached to these outer jaws at or near the middle. B B are the pitman-head wrist or catch pins for the radius or guide rods to take hold of, which catch-pins are firmly attached to the inner jaws C C, and project outward through the slots D D in the jaws A A. C C are the inner jaws of the pitman-head, and have vertical slots J, through which the wrist-pin K passes. E is an adjusting-screw, placed at the bottom of the outer jaws A A, and provided with two screw-nuts, F F. G is the saw-buckle, which we prefer to have open at the bottom, and provided with a gib, H, and key I; but any convenient style of saw-buckle may be used with our pitman-head. The adjusting-screw E passes through a hole in the bow or lower part of the inner jaws C; and the screw-nuts F F are placed on the screw E, one above, and one below, the bow, so that the inner jaws, which carry the guide-pins B B, may be adjusted by turning such nuts on the screw E, while the wrist-pin K, from which the lower end of the saw swings, is undisturbed; the slots J in the inner jaws admitting of their adjustment without interfering with the wrist-pin K.

By this arrangement, the pitman-head guide-pins B B may be adjusted to regulate the amount of oscillation required without altering the relative positions of any other parts of the saw-hangings.

What we claim as our invention, and desire to secure by Letters Patent, is—

1. A pitman-head having outer jaws A A, to which the wrist-pin is attached, and inner adjustable jaws C C, carrying the catch or guide pins B B, substantially as shown and described.

2. A pitman-head having outer jaws A A and inner adjustable jaws C C, combined with an adjusting-screw, E, substantially as shown and described.

LAWRENCE MORRISON.
AMOS G. HARMS.

Witnesses:
L. R. LINDSAY,
H. A. SPANGLER.